3,081,295
DISPERSE MONOAZO DYES
John D. Sterling, Jr., Wenonah, N.J., assignor to E. I. du Pont de Nemours and Company, Wilmington, Del., a corporation of Delaware
No Drawing. Filed Dec. 22, 1960, Ser. No. 77,506
3 Claims. (Cl. 260—205)

This invention relates to novel disperse azo dyes which are useful in dyeing cellulose triacetate materials and polyester materials such as polyethylene terephthalate fibers. It is an object of this invention to provide yellow to orange disperse dyes which possess good light- and sublimation-fastness, good build-up and application properties and which are particularly suited for application to fiber by the thermosal process, that is by the impregnation and dry-heat fixation method set forth by J. W. Gibson, Jr., in U.S.P. 2,663,612.

The problem of sublimation, particularly in the dyeing of polyester materials, is discussed in detail by M. F. Sartori, in U.S.P. 2,782,187, wherein he also provides a remedy for said problem by selecting certain monoazo dyes, characterized by possessing an N-bis(cyanoethyl)-aniline coupling component. The dyes there disclosed give orange to red dyeings. It is also taught in said patent that the presence of two cyanoethyl radicals on the N-atom of the aniline coupling component is essential to the joint presence of light fastness and sublimation fastness in the dye, and that analogous monoazo dyes having but one cyanoethyl substituent on the amino group were found to be inferior in respect to sublimation fastness.

I have now found that in the range of shades of yellow to orange, dyes of satisfactory light-fastness and sublimation fastness, and of the other good qualities aforementioned, may be found in a novel group of monoazo dyes which possesses only one cyanoalkyl radical on the N-atom. More particularly, I have found that the primary objects of this invention are satisfied to a high degree by the group of monoazo dyes defined by the formula

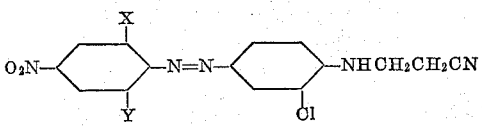

wherein X and Y represent members of the group consisting of hydrogen and chlorine.

It will be noted that my novel group of compounds is further distinguished from those of Sartori in that they all have a Cl-atom in ortho position to the cyanoethyl-amino goup.

My novel compounds may be prepared by standard methods, i.e. by diazotizing a paranitroaniline of the formula

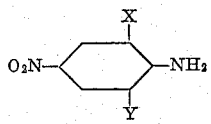

(wherein X and Y represent hydrogen or chlorine) and coupling, in acid solution, to o-chloro-N-(2-cyanoethyl)-aniline.

Without limiting this invention, the following examples are given to illustrate my preferred mode of operation. Parts mentioned are by weight.

*Example 1*

28.0 parts of finely ground, dry sodium nitrite are added to 400 parts of 98% sulfuric acid while stirring and maintaining the temperature at 25° to 30° C., and the mixture is stirred at 30° to 40° C. until a clear solution is obtained. Powdered 2,6-dichloro-4-nitroaniline (82.4 parts) is then added over a period of two hours, the temperature being maintained at 25° C. The solution is stirred an additional hour at 30° C., and the mass is then poured slowly into crushed ice (1600 parts), while stirring and maintaining the temperature at 2° to 3° C. The diazo solution is then filtered, and the filtrate is added in about 15 minutes to a mixture of 82 parts of o-chloro-N-(2-cyanoethyl)aniline and 300 parts of 37% hydrochloric acid, while stirring and keeping the temperature at 0° to 3° C. After stirring the mixture at 0° to 3° C. for 12 hours, the dye is filtered off, washed with water until free of acid (Congo red), and dried. Alternatively, the pH of the reaction mixture can be raised to 4–5 by the addition of 30% caustic solution, after which the dye can be removed by filtration, and dried. The new dye has the formula

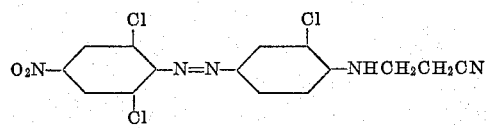

and may be named 4-(2,6-dichloro-4-nitrophenylazo)-2-chloro-N-(2-cyanoethyl)aniline.

It is an orange-tan powder, having an absorption maximum in methanol at 396 millimicrons. The novel dye colors cellulose triacetate and unmodified polyester fibers by disperse dyeing methods in gold shades of good light and sublimation fastness. It also exhibits good dyeing properties, such as levelness and build-up.

*Example 2* o-Chloro-p-nitroaniline is diazotized and coupled to o-chloro-N-(2-cyanoethyl)aniline by the procedure described in Example 1. The dye obtained, which may be named 4-(2-chloro-4-nitrophenylazo)-2-chloro-N-(2-cyanoethyl)aniline, has an absorption maximum of 448 millimicrons in methanol. It dyes cellulose triacetate and unmodified polyester fibers in orange shades of good fastness, and has good dyeing properties.

*Example 3* p-Nitroaniline is diazotized and coupled to o-chloro-N-(2-cyanoethyl)aniline as in Example 1. The dye obtained has the formula

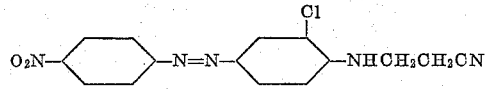

and may be named 4-(4-nitrophenylazo)-2-chloro-N-(2-cyanoethyl)aniline. It dyes cellulose triacetate and unmodified polyester fibers in orange shades of good light- and sublimation-fastness, and has good dyeing properties.

I claim as my invention:
1. A monoazo dye of the formula

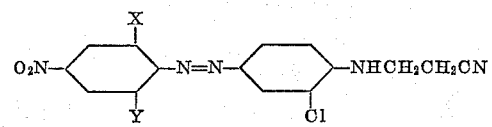

wherein each of the symbols X and Y represents a member of the group consisting of hydrogen and chlorine.
2. 4-(2-chloro-4-nitrophenylazo)-2-chloro-N-(2-cyanoethyl)aniline.
3. 4-(2,6-dichloro-4-nitrophenylazo)-2-chloro-N-(2-cyanoethyl)aniline.

References Cited in the file of this patent
UNITED STATES PATENTS

| | | |
|---|---|---|
| 2,109,024 | Holzach et al. | Feb. 22, 1938 |
| 2,261,175 | McNally et al. | Nov. 4, 1941 |
| 2,782,187 | Sartori | Feb. 19, 1957 |